(12) United States Patent
Declerck et al.

(10) Patent No.: US 6,289,135 B1
(45) Date of Patent: *Sep. 11, 2001

(54) ELECTRONIC IMAGE PROCESSING DEVICE FOR THE DETECTION OF MOTIONS

(75) Inventors: Jèrôme Declerck, Mougins; Nicholas Ayache, Nice; Jacques Feldmar, Montmagny, all of (FR)

(73) Assignee: Inria Institut National de Recherche en Informatique et en Antomatique, le Chesnay Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,621

(22) Filed: Nov. 4, 1997

Related U.S. Application Data

(60) Provisional application No. 60/039,377, filed on Mar. 20, 1997.

(51) Int. Cl.[7] ................................................... G06K 9/36
(52) U.S. Cl. ........................ 382/276; 382/132; 382/154; 382/190; 324/309; 600/425
(58) Field of Search .................................... 382/154, 128, 382/130–132, 190–191, 201, 276–280; 600/423, 425, 407; 378/21, 425; 324/309, 320

(56) References Cited

U.S. PATENT DOCUMENTS

| | | | | |
|---|---|---|---|---|
| 3,905,045 | * | 9/1975 | Nickel | 382/130 |
| 4,585,992 | * | 4/1986 | Maudsley et al. | 324/309 |
| 4,678,995 | * | 7/1987 | Avison et al. | 324/309 |
| 4,773,861 | * | 9/1988 | Dufur | 434/135 |
| 5,073,752 | * | 12/1991 | DeMeester et al. | 324/309 |
| 5,162,736 | * | 11/1992 | Mansfield et al. | 324/309 |
| 5,268,998 | * | 12/1993 | Simpson | 345/427 |
| 5,315,512 | * | 5/1994 | Roth | 600/442 |
| 5,353,795 | * | 10/1994 | Souza et al. | 600/423 |
| 5,458,126 | * | 10/1995 | Cline et al. | 600/425 |
| 5,539,316 | * | 7/1996 | Sukumar | 324/320 |

* cited by examiner

Primary Examiner—Matthew C. Bella
Assistant Examiner—Gregory Desiré
(74) Attorney, Agent, or Firm—Foley & Lardner

(57) ABSTRACT

An electronic processing device receives sets of image data representing respectively sequential three-dimensional digital images of the same region. This device comprises means capable of defining a three-dimensional shape of interest on the basis of at least one of the sets of image data, and of extracting from each set image data representing characteristic points of the shape of interest, processing means for establishing on the basis of the image data of the contours a spatial-temporal planispheric transformation making it possible to pass from characteristic points extracted from one image to the characteristic points extracted from another image of the sequence, and means for displaying selected motion data derived from the parameters of the transformation.

23 Claims, 7 Drawing Sheets

ELECTRONIC IMAGE PROCESSING DEVICE FOR THE DETECTION OF MOTIONS

This application is based on provisional application 60/039,377 filed Mar. 20, 1997.

FIELD OF THE INVENTION

The invention concerns the processing of sequential three-dimensional digital images of the same region, with a view to detecting movements in a shape of interest common to the images.

The invention applies more particularly, but not exclusively, to so-called medical images and especially to sequential digital images of the regions of the heart as, for example, the left ventricle.

In certain fields, it may be useful to analyse the spatial-temporal evolution of a region. This is, in particular, the case in the medical field, and yet more particularly in cardiology, because the tracking of the cardiac muscle (the heart) with respect to time may allow a physician to detect anomalies, and thus possibly prevent accidents.

PRIOR ART

In the field of medical imaging, a three-dimensional (3D) image is constituted by a set of image data obtained by tomoscintigraphy, or by nuclear magnetic resonance (MRI), or more generally any type of apparatus capable of acquiring images based on variations in intensity. Each elementary part (or voxel) of a region represented by a 3D image is defined by an image data item, comprising (Cartesian) position information and at least one intensity (measured value).

The expert has developed various techniques for trying to track the motions of the left ventricle of the heart. This is, in particular, the case with the technique termed "models of a deformable contour type" (see for example, A. Amini and J. Duncan, "Bending and Stretching Models for LV Wall Motion Analysyis from Curves and Surfaces" in "Image and Vision Computing", Vol. 10 pp. 418–430, August 1992), or the technique termed "Spring-mass Meshes" (see, for example, C. Nastar, "Vibration Modes for non-rigid Motion Analysis in 3D Images", in European Conference in Computer Vision, May 1994), or yet again the techniques termed "free-deformed superquadrics" and "volumetric superquadrics" (see, for example, respectively E. Bardinet, L. D. Cohen and N. Ayache; "Tracking and Motion Analysis of the Left Ventricle with deformable Superquadrics" in Medical Image Analysis, 1(2), 1996; and J. Park, D. Metaxas and L. Axel, "Analysis of Left Ventricular Motion based on volumetric deformable Models and MRI-SPAMM", in Medical Image Analysis, 1(1): 53–71, March 1996.

In these techniques, the tracking relies on conservation constraints based on constraints of proximity, differential surface properties or data regarding displacement or speed contained in certain MRI type images, such as "tagged images" or "phase contrast images".

The drawback presented by these techniques is related to the fact that they are based on correlations between successive pairs of images and that they therefore do not offer a regular, continuous and periodic transformation with respect to time. Moreover, the majority of these techniques do not provide any intuitive parameters (or chosen data) representing the motion of the analyzed shape of interest. It is, therefore, necessary to use far from trivial, and therefore lengthy and expensive, calculations to allow their analyses to be utilized.

OBJECT OF THE INVENTION

The object of the present invention is therefore to improve the situation in the field of sequential digital image processing.

SUMMARY OF THE INVENTION

For this purpose, it proposes an electronic device for the processing of sets of image data representing respectively three-dimensional digital images of the same region, taken at successive instants, and comprising:
  means operative to define a three-dimensional shape of interest, as for example an active organ with cyclic motion, on the basis of at least one of said sets of image data, as well as to extract from each of the sets of image data, image data of the characteristic points of the defined shape of interest;
  processing means to establish, on the basis of the image data representing the characteristic points of the shape of interest of each image, a four-dimensional (4D) transformation in space and time (or a spatial-temporal transformation), and preferably planispheric, making it possible to pass continuously from the characteristic points extracted from a starting image of the sequence, for example the first image, to the characteristic points of another image of the sequence; and
  display means operative to display selected data derived from parameters of the transformation, and preferably representing the spatial-temporal evolution of the image data of the characteristic points of the shape of interest.

The starting image is understood to mean any one of the images of the sequence or a stored reference image representative of the shape of interest at a known instant, which defines a starting space and which serves as a temporal reference.

In other words, for a 3D image sequence, a 4D transformation is determined, making it possible to pass from the characteristic points of one image (representing its contour for example) to the characteristic points of another image, and possibly to revert to the starting characteristic points (temporal continuity and optionally periodicity) and on the basis whereof it is easy to draw intuitive motion data.

In a particularly advantageous way, the four-dimensional (4D) transformation is a planispheric transformation. The processing means are then capable of defining in the three-dimensional Cartesian space, a so-called "planispheric" three-dimensional reference system formed by three vectors that are orthogonal to one another and respectively parallel to the characteristic directions of the shape of interest in the Cartesian space. Such a reference system is equivalent to a combination of spherical and cylindrical reference systems. It is particularly advantageous for processing shapes of interest, such as that of the left ventricle of the heart (or myocardium), since it makes it possible to represent it substantially in the form of a disk, thus considerably simplifying the analysis of the tracking of its dynamic evolution.

By way of example, in the case of a left ventricle, the three easily recognisable characteristic directions are called apico-basal, septo-lateral and infero-anterior.

To allow the planispheric reference system to be used, the processing means is capable, on the one hand, of applying to the image data in the initial Cartesian space, a first transfer function making it possible to transform their Cartesian spatial coordinates into planispheric spatial coordinates and, on the other hand, of applying to these image data in the planispheric space, a second transfer function making it possible to transform their spatial planispheric coordinates into Cartesian spatial coordinates.

In the case where the planispheric reference system is used, the 4D transformation may thus be represented by the composition of the first coordinate transfer function, of a transfer function of the characteristic points making it possible to pass from the three-dimensional planispheric coordinates of the characteristic points of one image to the three-dimensional planispheric coordinates of the characteristic points of another image of the sequence, and of the second transfer coordinate function.

According to yet another characteristic of the invention, the selected data derived from the transformation, represent three canonical motions orthogonal to one another namely: a radial motion relative to the origin of the planispheric reference system, a rotation relative to one of the vectors of this planispheric reference system (the apico-basal axis in the case of a left ventricle), and an elevation relative to this same vector of the planispheric reference system.

Preferably, the processing means are arranged to apply, to the image data representing image data of the characteristic points in the planispheric reference system, an operator of the "least squares" type, so as to determine the transfer function of the characteristic points.

In a first application to conventional digital 3D images (each image data item comprising a 3D position information plus one intensity), the processing means are arranged to determine the transfer function of the characteristic points in an iterative manner, starting from an "initialization" function which is preferably chosen from a plurality of predetermined functions stored for example, in a register. In other words, loops are effected by testing a new transfer function of the characteristic points each time until a sufficient convergence level has been reached, or a predetermined number of loops has been effected.

For example, the initialization function which is chosen for starting the determination of the function for transferring the characteristic points is the identity function.

But in a variant, the "initialization" function may be determined by the processing means from sets of image data.

According to yet another characteristic of the invention, before applying the operator of the least squares-type, a selection of the extracted image data is effected. To do this, the processing means are arranged so as:

to apply firstly to each image data item extracted from an image In, taken at a given instant Tn, the transfer function of the characteristic points calculated during the preceding iteration (during the very first iteration, this will be the initialization function) so as to obtain an estimated image data item capable of corresponding to the extracted image data item.

secondly to determine, from the image data extracted from the image In at most one proximity image data item, whose planispheric spatial coordinates are comparable to those of the estimated image data item, and thirdly to apply a first proximity criterion to each pair formed by one estimated image data item and one proximity image data item, so as to determine for each image the pairs which verify the first criterion.

Preferably, the processing means are, moreover, arranged so as to apply a second proximity criterion to the pairs determined by means of the first criterion, so as to form a list of filtered (or selected) pairs intended to represent the image data of the characteristic points to which the operator of the "least squares" type will be applied.

Advantageously, the convergence criterion terminating the iterative calculation is applied to the transfer function of the characteristic points obtained during the preceding iteration and by the current iteration. Thus when the last two calculated functions are substantially identical, and preferably completely identical, the iterative procedure is stopped, and the transfer function of the characteristic points corresponding to the current iteration is retained for forming the 4D transformation.

In a second application to particular 3D digital images, as for example "tagged" images where the image data are constituted by three three-dimensional digital image series of the same region where each of the series represents the region (or shape) of interest along a direction orthogonal to the direction of a tagging plane, the three tagging directions being orthogonal with respect to one another and each image of the series containing the characteristic tagging lines (the intersection of the tagging planes with the sectional planes), the processing means are arranged to obtain a correspondence between the characteristic lines of successive images of the sequence, and then to merge together the three images (also called sub-images) of each tagged 3D image series, so as to form the image data representing the volumetric characteristic points of the shape of interest.

The invention also applies to tagged images of the SPAMM type (Spatial Modulation of Magnetization) which are well known to the expert, wherein each image is constituted not by three series of images (or sub-images) but only by two.

According to yet another characteristic of the invention, the means for defining the shape of interest comprise manual and/or automatic selection means. The automatic selection means are optionally arranged so as to define the shape of interest from a comparison of the shape of the image and at least one theoretical shape stored, for example, in a register.

As indicated above, the device in accordance with the invention is particularly suitable for medical digital images, preferably of the regions of the heart of a living being, and yet more precisely of the left ventricle (or myocardium whose internal and external contours are respectively called endocardium and epicardium).

The invention also proposes a method for processing the image data so as to operate the device presented above. Such a method comprises the following steps:

defining a three-dimensional shape of interest on the basis of at least one of image data sets;

extracting from each one of image data sets image data representing characteristic points of the shape of interest;

on the basis of the image data of the characteristic extracted points establishing a transformation, preferably a planispheric four-dimensional (4D) transformation in space and time (or a spatial-temporal transformation), making it possible to pass continuously from the characteristic points extracted from one image termed "starting image" to the characteristic points extracted from another image of the sequence; and deriving selected data representing the motion of the said shape of interest from the parameters of the transformation.

BRIEF DESCRIPTION OF THE DRAWINGS

Other characteristics and advantages of the invention will become apparent on examining the detailed description that follows, as well as the attached drawings, wherein.

DETAILED DESCRIPTION OF THE PREFERRED EMBODIMENTS

The drawings are, in essence, of a definitive nature. They therefore form an integral part of the present description. They may thus serve not only to make the invention more readily understood, but also to contribute to the definition thereof.

In the following discussion, reference will be made to the processing of medical digital images, and more particularly, but only by way of example, to the processing of medical images of the tomoscintigraphic, or MRI-type (magnetic Resonance Imaging) of a region of the heart of a human subject.

Figures 1, 2:
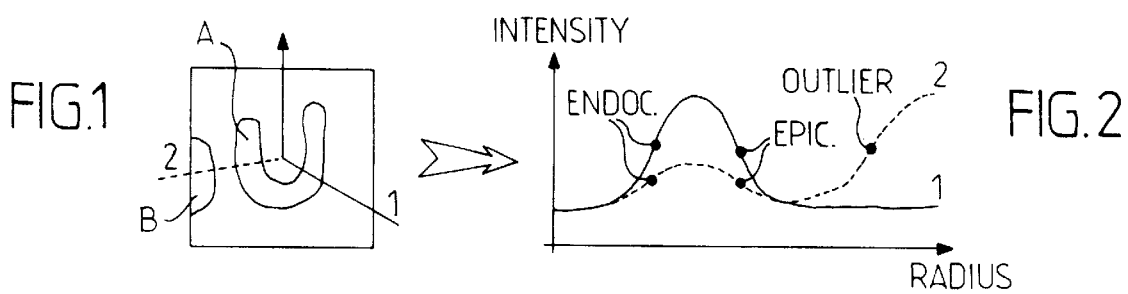
FIG. 1 is an image of a sectional view of a region of a human body before treatment.
FIG. 2 is a diagram representing the intensities of the image data of FIG. 1 in two directions in accordance with the motion retreating relative to an origin.

In FIG. 1, the contours of two organs A and B contained in a region of the human body are partially and schematically illustrated. In this example, the organ A is the heart, and more precisely, the contractile portion of the muscle called the myocardium which forms its wall. Even more precisely, the contour of the organ A represents the cavity which constitutes the left ventricle of the heart. The organ B is for example the liver.

A conventional three-dimensional (3D) image of the tomoscintigraphic or MRI type is generally formed by a multitude of image data placed in a register one after the other, along their temporal and spatial position order. Each image data item therefore represents a point whose position relative to a Cartesian reference system (or reference frame), as well as at least one item of intensity information, are known. To be even more precise, the image data of a 3D image form a list (or a table arranged in order), wherein the position of the data item implicitly provides the position coordinates of a point (or voxel) of the observed organ, here the cardiac muscle. In point of fact, a tomoscintigraphic or conventional 3D MRI image is formed by a stack of two-dimensional (2D) images. The intensity is generally comprised between the values 0 and 1.

The apparatus in accordance with the invention makes it possible to process such images, and more particularly, image sequences formed by a multiplicity of 3D images (for example, eight or ten) taken at successive instants in the course of a complete or partial functioning cycle of the organ, here the heart.

Figure 3:
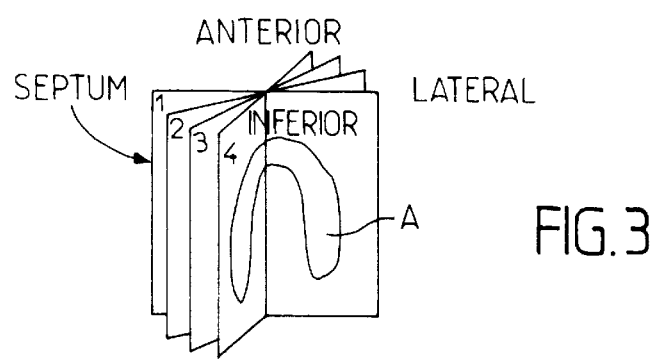
FIG. 3 is a diagram illustrating various sectional planes of the organ (the shape of interest) isolated from the image of FIG. 1.
Figure 4A:
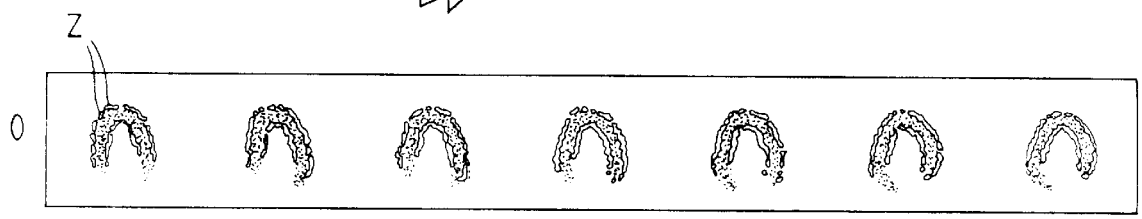
FIGS. 4A to 4D are tomoscintigraphic images, each illustrating seven different sectional planes of the organ of FIG. 3, taken respectively at successive instants, and wherein the surrounded zones represent very schematically characteristic points of the organ, which are extracted automatically.
Figure 4B:
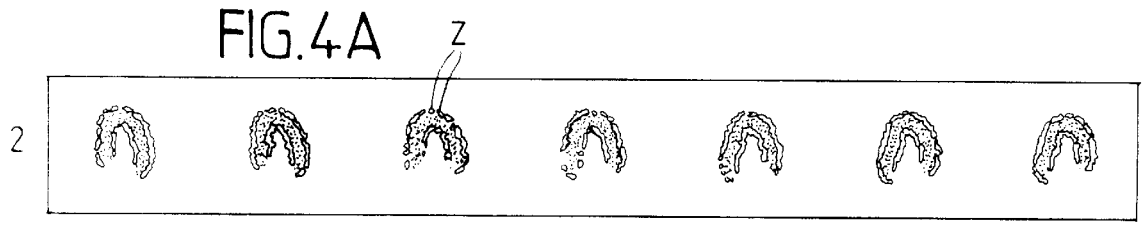
Figure 4C:
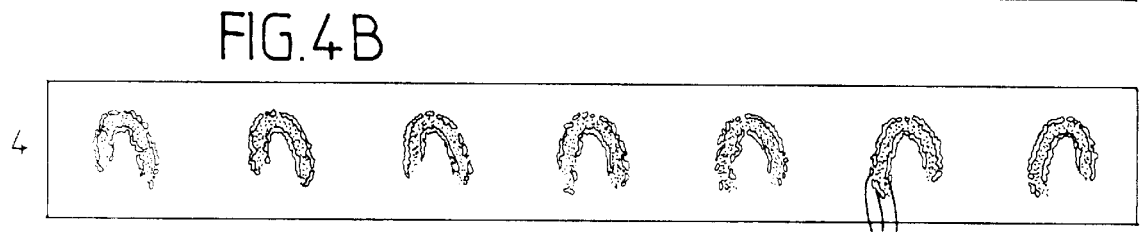
Figure 4D:
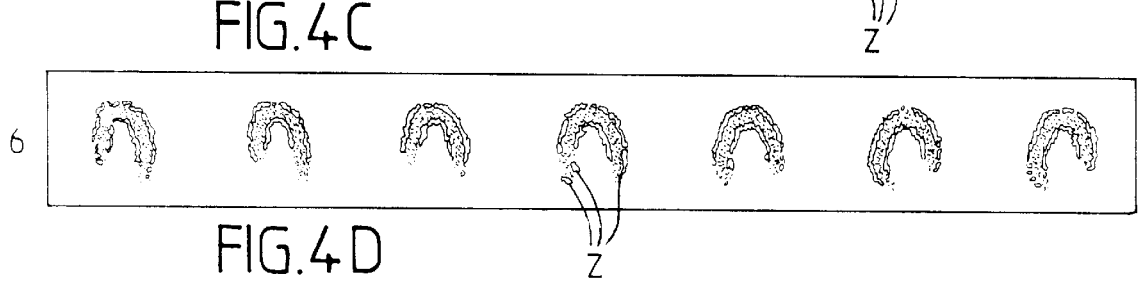

By way of example, the evolution of the contours of a myocardium have been represented at four different and successive instants, and in seven different views corresponding to the sectional planes indicated in FIG. 3.

In point of fact, the images illustrated in FIGS. 4 are images which have already been subjected to two processing operations, to which we will revert below, the first consisting of eliminating the organ B visible in the left-hand portion of FIG. 1, and the second consisting of determining the coordinates of the characteristic points of the internal (endocardium) and external (epicardium) contours of the myocardium A, these two processing operations being effected by a so-called defining module 1000.

To permit the differentiation of the organs, here A and B, visible in a 3D image, the device in accordance with the invention comprises the above-mentioned defining module 1000, capable of eliminating the organ B so as to retain only the organ A, for example by means of an analysis of the intensity of the image data according to a regular sampling of the directions (whereof two bear the reference numerals 1 and 2 in FIGS. 1 and 2 by way of example). As illustrated in the diagram of FIG. 2, the observation along the direction 1 makes it possible to obtain the internal (endocardium) and external (epicardium) contours of the myocardium, while the observation along the direction 2 makes it possible to obtain the endocardium, the epicardium and the external contour of the organ B, here the liver. By undertaking a certain number of observations along different directions, it is therefore relatively easy to select only the image data of the organ A, here the myocardium, so as to define the shape of interest.

This definition (selection) of the shape of interest may be effected either automatically or manually by causing a technician or a physician to intervene. One example of the method for the automatic extraction of characteristic points for tomoscintigraphic images is given in a Public Research Report of INRIA, No. 270 of January 1996, of Jérôme Declerck, Jacques Feldmar, Michael L. Goris and Fabienne Betting.

It is obvious that in the manual case, the definition-selection can only be effected on the basis of displaying at least one of the initial images of the sequence; in general it is one of the 2D images forming a 3D image. The defining module 1000 is then arranged so as to identify, in the other two-dimensional images of the three-dimensional stack forming the 3D image, the parts comprising the selected shape of interest. To permit such a selection of the shape of interest, provision may be made for a user interface such as a mouse, for example.

In the case of an automatic selection it is the defining module 1000 that determines the shape of interest. This determination of the shape of interest may optionally comprise a substage wherein the defined shape is compared with some theoretical shapes of interest stored in a register (or table) of the device, so that in the case of an incomplete definition, the shape of interest can be artificially completed, thus facilitating the determination of the characteristic points of its contours.

Preferably, the automatic definition of the contours is effected by means of a technique termed "by radial sampling" which is well known to the expert. This step may also comprise a recursive Canny-Deriche type filtering. The above mentioned technique and filtering have been described in the INRIA Research Report No. 2770 of January, 1996 already referred to.

Figure 5A:
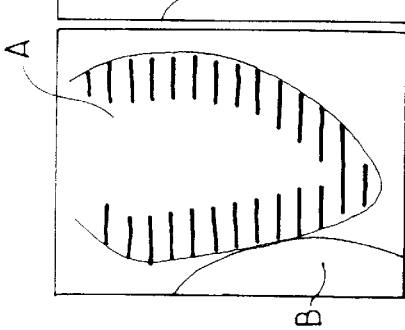
FIGS. 5A to 5C are "tagged" 2D MRI images, taken at successive instants, of a section along a characteristic direction of an organ of a patient having been subjected to special tagging and wherein the characteristic lines represent magnetic field lines.
Figure 5B:
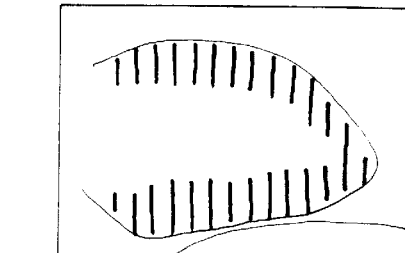
Figure 5C:
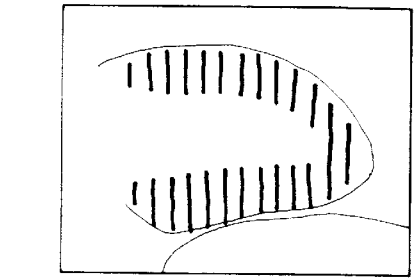
Figure 6A:
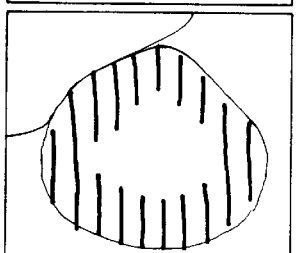
FIGS. 6A to 6C are "tagged" two-dimensional MRI images, taken at successive instants, of a section along a characteristic direction of an organ of a patient having been subjected to a particular treatment, and wherein the characteristic lines represent magnetic tagging lines.
Figure 6B:
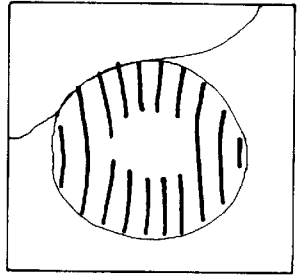
Figure 6C:
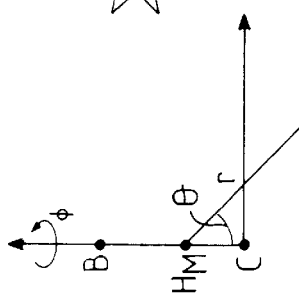

The device in accordance with the invention may also process non-conventional MRI image sequences, as for example the so-called "tagged" images which comprise characteristic tagging lines. Such images are shown in FIGS. 5 and 6 which respectively illustrate sectional views along the major axis (termed apico-basal) and the minor axis of the heart. In fact, each tagged MRI image is formed by a series of three images when the tagging is conventional, but it may be formed by only two images in the variant termed SPAMM (Spatial Modulation of Magnetization) which is well known to the expert.

In the case of a conventional MRI image, the three images (or subimages) which constitute it represent the organ along three directions of observation which are orthogonal with respect to one another. Thus an image data item of such a tagged MRI image comprises an item of three-dimensional position information (in three samples), an intensity information (in three samples) and a position information concerning the magnetic tagging (three different positions).

Once the shape of interest, here the left ventricle, and its characteristic points have been defined, one is left with n (for example n=8) three-dimensional images each corresponding to one instant of the sequence (or cycle), each image being formed by a set of image data. Each image data item represents a characteristic point M of an elementary part of the (internal or external) contours of the organ, here the left ventricle of the heart, as well as the intensity or vectorial field recorded at this point. But an image data item may also comprise an intensity gradient vector, for reasons which will be explained below.

Such characteristic points N are indicated very schematically by the surrounded zones Z on the organ illustrated in FIGS. 4A to 4D, where they represent the contours of the organ. As may be observed in these FIGS. 4A to 4D, it is not necessary to determine all the characteristic points N forming the contours of the shape of interest.

This step of determining on the one hand the shape of interest, here the left ventricle, and on the other hand the characteristic points of the contours of this shape of interest, here the endocardium and the epicardium, forms the first step 10, (see FIG. 8) of the mechanism for processing a sequence of conventional tomoscintigraphic images, which step is termed the segmentation step.

At the end of this step 10, one is thus left with as many sets of image data representing characteristic points of the contours as there are images in the sequence, that is to say, her eight sets. Below, we shall call the sets of image data of the characteristic points "set of image data of the contours".

It is obvious that it is possible to use only one single unprocessed set of image data for determining the three-dimensional shape of interest, and to use the coordinates of this set of image data for eliminating from the sets of image data of other sequence images, those which represent organs of no interest. But it is possible to proceed in a different way, for example by determining the three-dimensional shape of interest in each set of the unprocessed image data.

Once the first step 10 has been completed, or in other words, once the sets of image data representing the contours of the shape of interest have been determined, the device in accordance with the invention must extract from these sets information concerning the motion of the contours of the shape of interest, here the myocardium.

To do this, it comprises a processing module 2000 intended firstly to identify the characteristic axes or directions in the shape of interest, as defined in the first step 10. In fact, Applicants have found that it was possible to simplify the processing of the sets of image data of the contour by transposing the shape of interest from the Cartesian space wherein it was initially situated, into a space termed a planispheric space, resulting from a combination of spherical and cylindrical spaces. The reasons for this choice will be more readily understood by the explanations given below with reference to FIGS. 7A to 7C.

In the case of a hollow organ of the type such as the left ventricle, three axes may be defined which are orthogonal with respect to one another, among them a major axis generally termed the apico-basal axis, and two minor axes termed septo-lateral and anterior axes (see FIG. 3). On the apico-basal axis, two points C and B may be determined which respectively determine the arbitrary centre of the cavity, and the centre B of the base of this cavity.

Figure 7A:
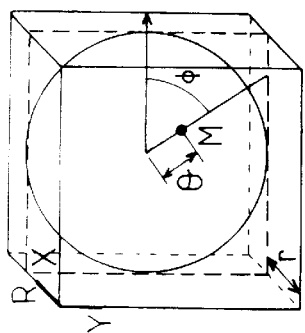
FIGS. 7A to 7C schematically illustrate three shapes of interest in Cartesian reference systems (the left-hand parts) and their corresponding representations in the planispheric reference systems.

In a planispheric reference system of the type illustrated in FIG. 7A, a point M is determined relative to a movable centre $H_M$, by a radius r, an angle of latitude θ and an angle of longitude Ø. In a spherical reference system, this point $H_M$ coincides with the centre C, whereas in a cylindrical reference system it corresponds to the orthogonal projection of the point M on the line CB. Thus the idea here is to define a combination of the spherical and cylindrical reference systems, so that the position of the point M can be roughly described by spherical coordinates in the vicinity of the apex (where the shape of the left ventricle is roughly spherical) and by roughly cylindrical coordinates in the vicinity of the base containing the point B (where the shape of the left ventricle is roughly cylindrical).

In a planispheric reference system, the position of the point $H_M$ on the axis CB (the apico-basal axis) can be determined by the formula:

$$CH_M = (1 - \cos\theta)CB \qquad (1)$$

For low $\theta$ values (when M is situated in the vicinity of the apex), $H_M$ is close to the centre C and moves away from C by a distance which increases $\theta^2/2$. In other words, in the vicinity of the apex the three-dimensional (3D) planispheric coordinates are close to the spherical coordinates. For $\theta$ values close to $\pi/2$, $H_M$ is close to the base B and the distance $BH_M$ varies substantially linearly with $\theta - \pi/2$. $H_M$ is then substantially orthogonal to CB. It follows from this that around the base B, the planispheric 3D coordinates are close to the cylindrical coordinates.

It is obvious that the formula (1) is implicit to the extent that $H_M$ gives the angle $\theta$, but that it is necessary to determine $\delta$ for locating $H_M$. In a Research Report INRIA No.3039 of November 1996 of Jérôme Declerck, Jacques Feldmar and Nicholas Ayache, Applicants have developed a method for determining the position of a point $H_M$ when the position of a point M in space is known.

Since one of the main objects of the device in accordance with the invention is to determine information of the displacement of characteristic points of the shape of interest, for example of its contours, it is therefore necessary, when the sets of image data defining the respective contours of each of the images of the sequence is known, to determine a four-dimensional (4D) transformation in space and time (or a spatial-temporal transformation), making it possible to pass from one contour to another contour, until one returns to the starting contour, if required. In other words, it is a matter of determining a continuous 4D transformation and which is optionally periodic with respect to time.

Thus this amounts to finding a transformation T of $R^3 \times R$ into $R^3$ which, at each pair $(M_i, t)$, associates the point $N_i = T(M_i, t)$. In other words, $T(M_i, t)$ represents the path of the point $M_i$ with respect to time (or in the course of one cycle).

Such a transformation (or function) must be at one and the same time spatially differentiable (along the coordinates x, y and z) and differentiable and possibly temporally periodic (as regards the variable t). Inasmuch as it is preferable to process the tracking of the motion of a point M in the course of one sequence (or of one cycle) in a planispheric reference system, the transformation T is chosen in the form of a composition of three transfer functions defined below.

A first transfer function C2P, termed a coordinate transfer function, makes it possible to transform Cartesian coordinates into three-dimensional planispheric coordinates. A second transfer function P2C, also termed a coordinate transfer function, makes it possible to pass from three-dimensional planispheric coordinates to three-dimensional Cartesian coordinates; one thus obtains $C2P = P2C^{-1}$. Finally, a third transfer function F, termed a function for transferring the characteristic points, makes it possible to track the evolution of the characteristic points M of a contour in the course of a sequence (or of a cycle), in the three-dimensional planispheric reference system.

The transformation T can therefore be rewritten as follows:

$$T = P2C \; O \; F \; O \; C2P.$$

Figure 7B:
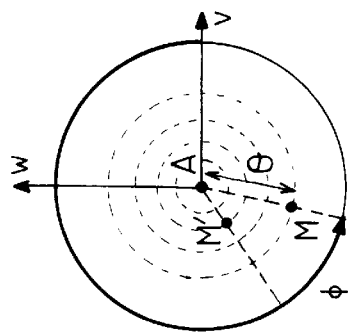
Figure 7C:
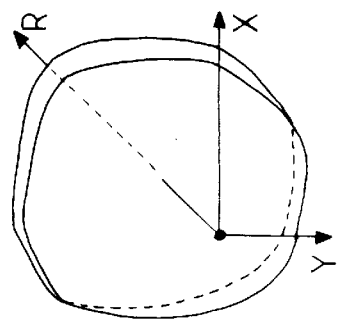

As illustrated in the FIGS. 7A to 7C, in a planispheric 3D reference system, a surface (r=constant) is represented by a disk in a plane, as in a conventional map projection in topography. In this planispheric reference system, a point is defined by the three coordinates X, Y and R, defined as follows:

$$X = (\theta/\pi)\cos(\theta)$$

$$Y = (\theta/\pi)\sin(\theta)$$

$$R = r/\sigma_r$$

Here, $\sigma_r$ is a normalization coefficient chosen so that the coordinates X, Y and R are dimensionless and vary in one interval by substantially similar values.

This equation system defines the first coordinate transfer function C2P.

The second coordinate transfer function makes it possible, when a point with coordinates X, Y, R is known in the planispheric three-dimensional reference system, such as $X^2 + y^2 \leq 1$, to determine the corresponding Cartesian coordinates x, y and z by calculating:

$\theta = \pi(X^2 + Y^2)^{1/2}$ and $\emptyset$ with the expressions of $\cos\emptyset$ and $\sin\emptyset$. As for the point $H_M$, it is calculated by the formula (1).

The transfer function F of the characteristic points makes it possible to determine for each point M with coordinates X, Y, R the transformed point M with coordinates X', Y', R' such that:

$$X' = a_0 X - a_1 Y + a_2$$

$$Y' = a_1 X + a_0 Y + a_3$$

$$R' = a_4 R + a_5$$

The coordinates X' and Y' are thus defined by a similitude function applied to the coordinates X and Y, while R' is defined by an affine function of R. The similitude and affine parameters are differentiable and continuous functions with respect to r, $\theta$, $\phi$ and t.

One then deduces from this linear expressions for the parameters $a_p$ (p=0 to 5), which will make it possible to determine characteristic motions of the characteristic points of the contours of the shape of interest, as will be described below with reference to FIGS. 12A to 12D.

In the 3D planispheric reference system, it is in fact possible to resolve each displacement with respect to time (from one image to the following image) of a point M into three characteristic canonical motions. A first canonical motion called radial motion describes the variation of the distance separating the point M from the centre C forming the origin of the planispheric reference system. This radial motion is given by the formula:

$$R'/R = a_4 + (a_5/R)$$

Figure 12A:
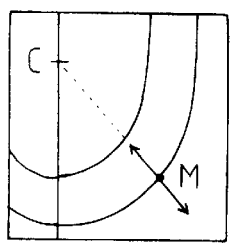
FIGS. 12A to 12C schematically illustrate the three types of canonical motion derived from the transformation, and FIG. 12D schematically illustrates the evolution of a characteristic point of the contour resolved along these canonical motions.

Such a motion, illustrated in FIG. 12A, describes the contraction or the dilatation of a contour element relative to the movable centre $H_M$.

Figure 12B:
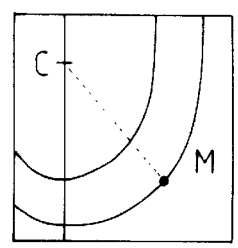
Figure 12C:
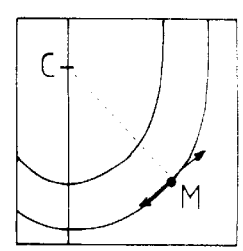
Figure 12D:
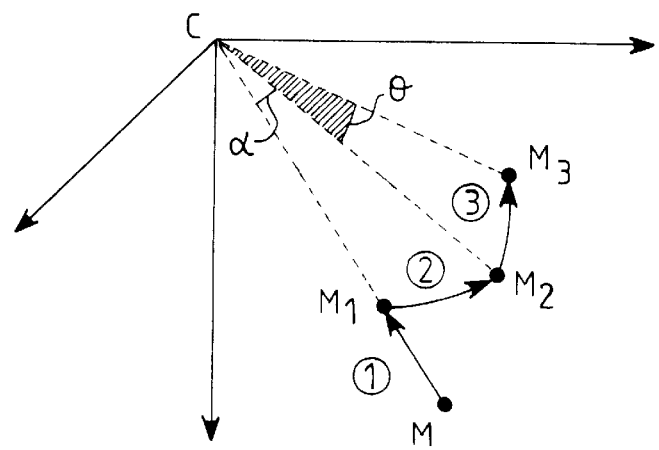
Figure 13A:
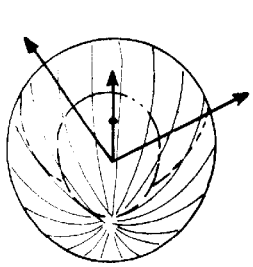
FIGS. 13A to 13C are three-dimensional (3D) representations of the contours of the characteristic points of an organ taken at different instants, each Figure illustrating the organ from the left towards the right, the organ being viewed at a first angle in a Cartesian space, viewed at a second angle in this Cartesian space, and viewed in a planispheric space.
Figure 13A:
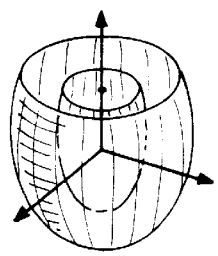
Figure 13A:
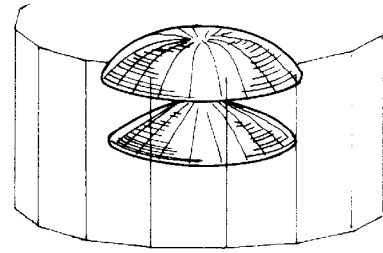
Figure 13B:
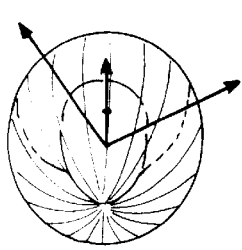
Figure 13B:
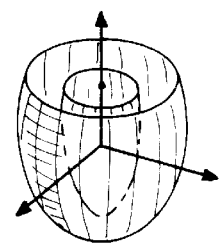
Figure 13B:
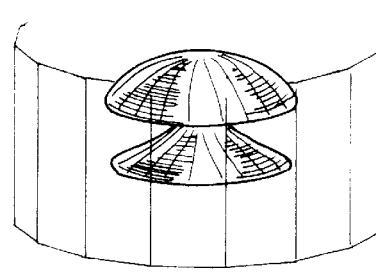
Figure 13C:
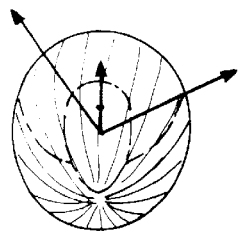
Figure 13C:
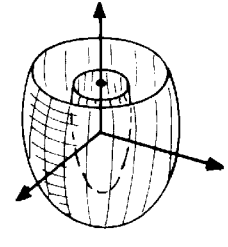
Figure 13C:
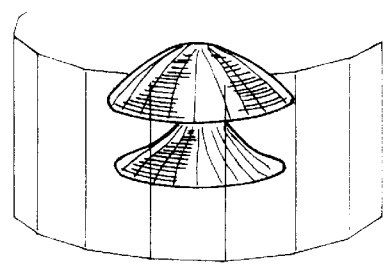

A second canonical motion illustrated in FIG. 12B consists of a displacement of the point M in a direction perpendicular to the radial direction, and perpendicular to the plane containing the Figure. This therefore concerns a rotation through an angle $\alpha$ round the apico-basal axis containing the points C and B defined above. This rotation is defined as follows:

$$\alpha = a \tan 2 \; (a_1/k, \; a_0/k)$$

$$k = (a_0^2 + a_1^2)^{1/2}$$

k is here a scale factor corresponding to an increase of the third canonical motion.

The third canonical motion (see FIG. 12C) is an elevation in latitude of an angle $\theta$ in the apico-basal direction which may be determined by calculating $(\theta' - \theta)/\theta$.

The 4D transformation T, and hence the displacement of a characteristic point with respect to time, are thus defined when the parameters $a_p$ have been determined. Because the variation of the parameters $a_p$ is smooth and regular along the variables r, θ, Ø and t, the parameters which describe the three canonical motions are also smooth and regular in time and space.

For calculating the parameters $a_p$, the polynomial functions are chosen with respect to r and θ and quadratic periodic B splines with respect to Ø, and quadratic and optionally periodic functions with respect to t of the type:

$$a_p(r, \theta, \phi, t) = \sum_{i=0}^{n_r-1} \sum_{j=0; j\neq 1}^{n_\theta} \sum_{k=0}^{n_\phi-1} \sum_{n=0}^{n_t-1} A^P_{i,j,k,n} \left(\frac{I}{\sigma_r}\right)^i \left(\frac{\theta}{\pi}\right)^j B^\Phi_k(\phi) B^T_n(t) \quad (2)$$

with p=0 to 4.

Because of the equation giving the radial motion, and of the expression of the parameter $a_p$, the parameters $a_4$ and $a_5$ are correlated, and it is therefore necessary to simplify the writing of the coefficient $a_5$ as follows:

$$a_p(r, \theta, \phi, t) = \sum_{j=0; j\neq 1}^{n_\theta} \sum_{k=0}^{n_\phi-1} \sum_{n=0}^{n_t-1} A^5_{j,k,n} \left(\frac{\theta}{\pi}\right)^j B^\Phi_k(\phi) B^T_n(t) \quad (3)$$

The parameters used in the expressions of the coefficients $a_p$ have the following meanings:

$n_r$ is the number of parameters defining the polynomial function of the variable r; the degree of this polynomial function being $n_r-1$;

$n_\theta$ is the number of parameters which define the polynomial function of the variable θ. To allow this function to be differentiable at the points for which θ=0, the polynomial function must not comprise any terms in θ; it is therefore of the type of $a_p(\theta) = a_p^0 + a_p^2 \cdot \theta^2 + a_p^3 \cdot \theta^3 \ldots$ however, $a_p$ is a polynomial function of θ of the degree of $n_\theta$;

$n_\emptyset$ is the number of control points of the periodic B-splines of the variable Ø;

$B^\emptyset$ designates the basic B spline functions associated with a conventional set of periodic points 2π distributed in a regular manner;

$n_t$ is the number of control points of the B-spline curve of the variable t;

$B^T$ designates the basic B spline functions associated with a conventional set of points distributed in a regular manner, periodic or aperiodic.

To ensure the continuity for θ=0, it is necessary to impose the constraint $A^P_{i,o,k,n} = A^P_{i,o,o,n}$ for each k. There thus exist $n_\emptyset - 1$ equations for each i and n. Finally, a number of control points are derived therefrom equal to $(5.n_r+1).(n_\emptyset. (n_\emptyset-1)+1).n_t$.

Once the planispheric reference system has been defined, as well as a set of the control points $A^P_{i,j,k,n}$ (a real number), the transformation has been completely defined.

The estimation of the 4D planispheric transformation T requires first of all the definition of the planispheric reference system, or in other words an identification of the characteristic axes of the shape of interest defined in step 10. This constitutes the step 20 of the mechanism of FIG. 8. The device in accordance with the invention thus determines on the basis of the image data of the characteristic points of the contour of the shape of interest, the apico-basal axis (in the case of the left ventricle), and two vectors perpendicular to this axis, related to the centre C of the cavity delimited by the internal contours, here the endocardium. Once the axes have been found, it is necessary to initiate (or start) the determination of the transformation T by choosing an initialization transformation $T_o$. Such an initialization transformation may be chosen from a multiplicity of stored transformation items, or it may be a one and only initialization transformation. This initialization transformation $T_o$ is the identity. This choice of the initialization transformation is effected by the processing module 2000 of the device during the third step 30.

In a variant, the initialization function can be calculated solely on the basis of the sets of image data.

The determination of the 4D planispheric transformation is continued in a fourth step 40 in the course of which the processing means of the device in accordance with the invention calculate, for each characteristic point $M_l$ of a contour of the shape of interest of an image taken at an instant $t_n$, the transformation $T_k(M_l, t_n)$ which is deemed to give the estimated position of the point $M_l$ at the instant $t_n$.

The determination of the transformation starts with the image data representing the characteristic points of a so-called "starting" image of the sequence. But this is not necessarily the very first image of the sequence. In fact, it suffices for the starting image (the first or the last or an intermediate image) to define a starting space, and that it is possible to attach a time reference relative to this starting space. Such a relative temporal reference may be determined, for example, in relation to a stored template or model representing the organ in the course of its analysis at a known given instant.

One then searches, in the image data of the contour of the shape of interest of the image taken at the instant $t_n$, for the point $CP_{n,l}$ which is closest to the point $T_k(M_l, t_n)$ previously calculated, which provides a first list of pairs of points which correspond to one another ($T_k(M_l, t_n)$, $CP_{n,l}$).

The determination of the point $CP_{n,l}$ closest to a point $M_l$ is preferably effected as indicated below.

First of all, two points M and N and their intensity gradient vectors determined during the extraction of the characteristic points of the contours being given, the distance between these two points M and N is given by the following formula:

$$d(M,N)^2 + \alpha.\|M\ N\|^2 + \|n_M - n_N\|^2 \quad (4)$$

where α is a positive normalization coefficient. The point $CP_{n,l}$ closest to a point M is then determined from the distance d(M,N), for example by means of an algorithm of the type of that known under the English name of "kd-tree", which is well known to the expert.

The processing module 2000 then calculates the residual distance $\|T_k(M_l, t_n) - CP_{n,l}\|$ for each pair of the list formed. Again, one only retains the pairs whose residual distance is less than a first threshold. This constitutes the fifth step 50. This first threshold (or first criterion) is taken to be relatively ample, so that only the most aberrant points are eliminated.

Figure 10:
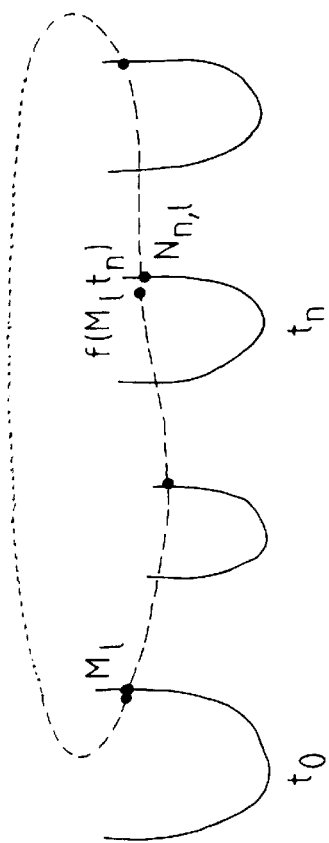
FIG. 10 schematically illustrates the displacement in the course of one cycle of a characteristic point of a contour of an organ, and two examples of estimated characteristic contour points capable of corresponding to said point.

An illustration of this method for determining the residual distance is illustrated in FIG. 10, the point $N_{n,l}$ being the point $CP_{n,l}$.

In this step 50, there is also effected a second filtering which consists of eliminating the pairs of remaining points whose residual distance separating them is greater than a second threshold (or second criterion) depending on a distance distribution $\mu + (c.\sigma)$, where $\mu$ is the mean dispersion and σ the standard dispersion of the distances of the remaining pairs, and c is a coefficient that can be easily determined by means of a table $\chi^2$.

This filtering provides a list $S_k$ of pairs of reliable points.

By means of this list $S_k$ of pairs of points, the transformation $T_{k+l}$ is calculated which is the best adjustment of the least squares type for the pairs of points of the list $S_k$. This constitutes the sixth step 60.

It is obvious that for determining the transformation $T_1(k=1)$, the steps 40 to 60 are undertaken by means of the initialization transformation $T_0$. Now since this transformation may not be optimal, it is preferable to repeat the steps 40 to 60 a certain number of times, while incrementing the index k of the transformation $T_k$ by one unit. This makes it possible to improve the accuracy of the transformation $T_k$. Nevertheless, with a view to determining whether such a repetition is indispensable, the processing module 2000 of the device in accordance with the invention proceeds, in a seventh step 70 after step 60 and before returning to step 40, to a comparison test between the transformation $T_{k+l}$ which has been calculated in step 60, and the transformation $T_k$ which was calculated during the preceding loop (or preceding iteration). It is obvious that at the end of the first iteration, the transformation $T_1$ is compared with the initialization transformation $T_0$ which is, for example, the identity.

For comparing the transformations between themselves, a criterion C(T) is defined which represents a sum of the residual distances measuring the "error" of the estimated transformation in relation to the data. This criterion which is minimized by the whole iterative procedure during step 40 is preferably defined as follows:

$$C(f) = \sum_{n=0}^{T-1} \sum_{i=0}^{N-1} \alpha_{n,1} \cdot d[f(M_1, t_n); CP_n(f(M_1, t_n))]^2 \tag{5}$$

$\alpha_{n,l}$ is a normalization coefficient which depends only on the pairs $(M_l, t_n)$.

This comparison effected in step 70 is an equality test $T_k = T_{k+l}$, which is satisfied when $S_k = S_{k+l}$. Once this condition has been obtained, the iterations are stopped.

Of course, in order to avoid proceeding with an unduly high number of iterations, the step 70 may include a test regarding the number of iterations that have been already effected, so that beyond a chosen number or (threshold) one decides that the iterations should be stopped.

It then only remains for the device in accordance with the invention to extract in an eighth step 80 the motion data from the transformation T which has been calculated. In other words, this amounts to determining the coordinates X', Y', R' of the points in the 3D planispheric reference system on the basis of the parameters $a_p$ of the transformation.

Figure 14:
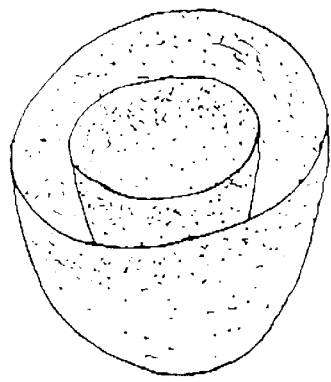
FIGS. 14A to 14C are three-dimensional (3D) representations of the contours of an organ at a chosen instant, wherein the points indicate the important intensity variations of the canonical displacements from the start of the cycle (first image of the sequence)
Figure 14:
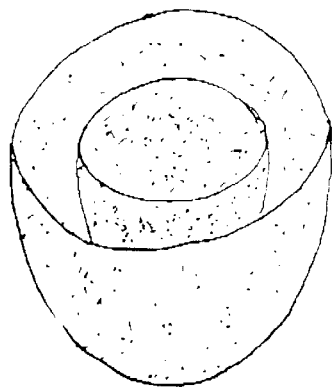
Figure 14:
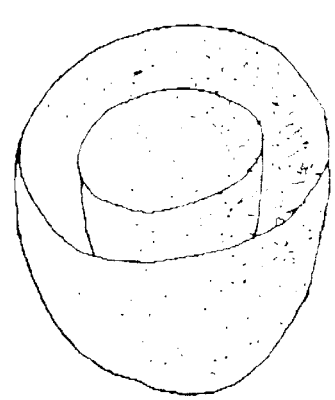

By means of a display module 3000, comprising for example a computer for three-dimensional representations and graphic display means (as, for example, a monitor), it is possible to extract spatial informations representing the canonical displacements. In FIGS. 14A to 14C, three-dimensional (3D) representations of the internal and external contours of the left ventricle have been represented, which respectively illustrate for each of their points the displacement amplitudes related to the start of the image sequence, and resolved along the three canonical motions.

Figure 15:
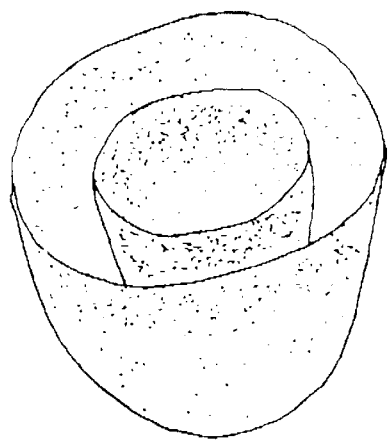
FIGS. 15A and 15B are three-dimensional (3D) representations of the contours of an organ, wherein the points indicate the important intensity variations of one of the canonical displacements (a radial motion) and of the phase in the course of one cycle.
Figure 15:
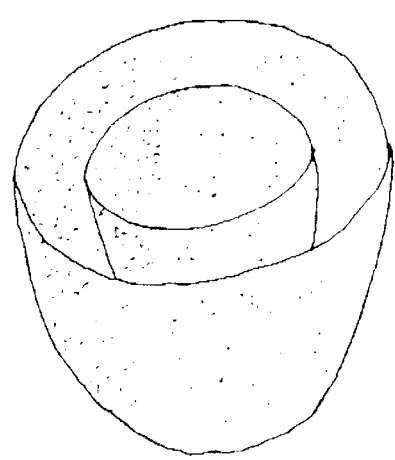

But, as illustrated in FIGS. 15A and 15B, it is also possible to deduce from the 4D transformation temporal data, as for example, the amplitude of the radial motion over a sequence or a cycle (see FIG. 15A), as well as the phase (see FIG. 15B) showing the synchronization of the contraction of various parts of the left ventricle in the course of this same cycle.

Figure 11B:
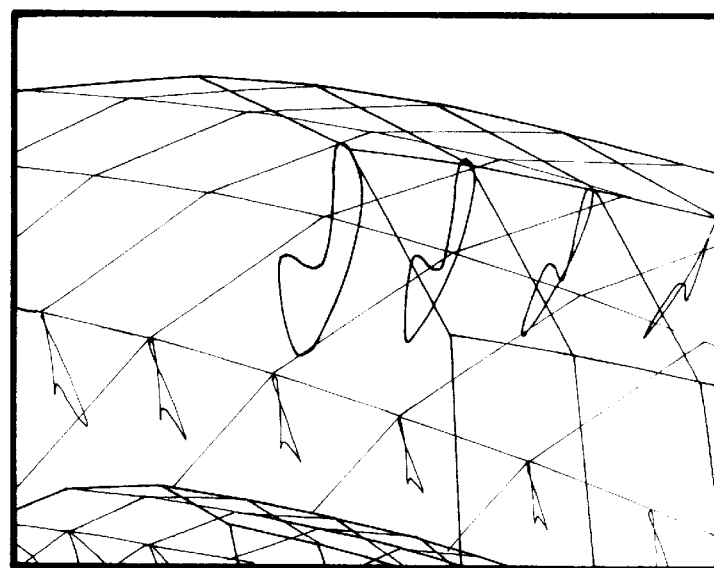
FIG. 11B is an enlargement of a portion of the representation of FIG. 11A.
Figure 11A:
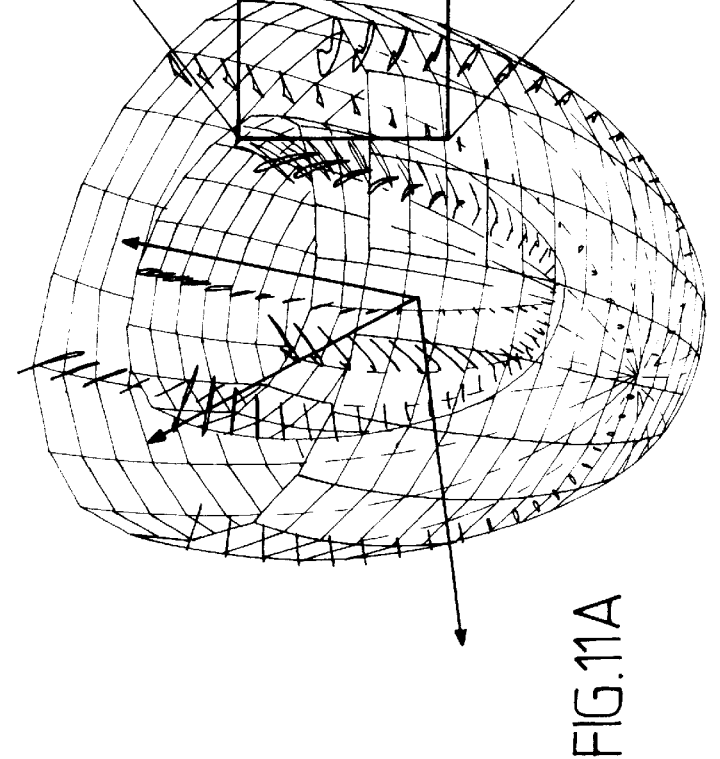
FIG. 11A is a three-dimensional (3D) representation of the contours of an organ with cyclic motion, wherein the displacements of certain points are indicated by closed curves representing the cycle.

It is also possible by means of the display module 3000 of the device in accordance with the invention to represent in a three-dimensional video image (see FIGS. 11A and 11B), the displacement of at least some of the points of at least one of the contours of the analyzed shape of interest in the course of one sequence (or one cycle).

As has been indicated above, the device in accordance with the invention can also be adapted to the processing of nonconventional MRI images of the tagged type. The operating mechanism of such a device differs slightly in detail from that described with reference to FIG. 8 for conventional MRI images. Such a mechanism is illustrated in FIG. 9.

It still comprises a first step 10, wherein the segmentation module 1000 defines the shape of interest, and a second step 20 wherein this same module 1000 identifies the characteristic axes of the shape of interest.

Because of the presence of the characteristic tagging lines in the 3D tagged images of the sequence, it is no longer necessary to calculate the transformation T by iterations. Indeed, Applicants have realised that these characteristic tagging lines included data making it possible to track the displacements of the characteristic points in a more direct manner than in the conventional tomoscintigraphic or MRI images. This makes it possible to dispense with an iterative procedure, since the transformation is calculated directly. However, this requires a special processing of the tagged 3D images.

Thus after the segmentation step 10, which makes it possible to determine the shape of interest and its contours, one proceeds in a step 90 to the extraction of the characteristic tagged lines or, more accurately, to the extraction of the corresponding image data.

Subsequently, in a step 100, a correspondence is established between the characteristic tagged lines of an image N and of those of the following image N+1, while repeating this for each pair of images. This correlation is relatively easy inasmuch as the characteristic tagged lines are substantially not displaced as compared with the distance between two adjacent lines.

Since each tagged MRI image is constituted by a series of three images taken along three directions perpendicular to one another, Applicants have observed that by merging the said three images of each tagged 3D image in a step 110, while taking into account the correspondence between the distinguishing lines of these different images, it was possible to deduce therefrom the correspondences between the characteristic points of the volume of the shape of interest of each image.

Figure 8:
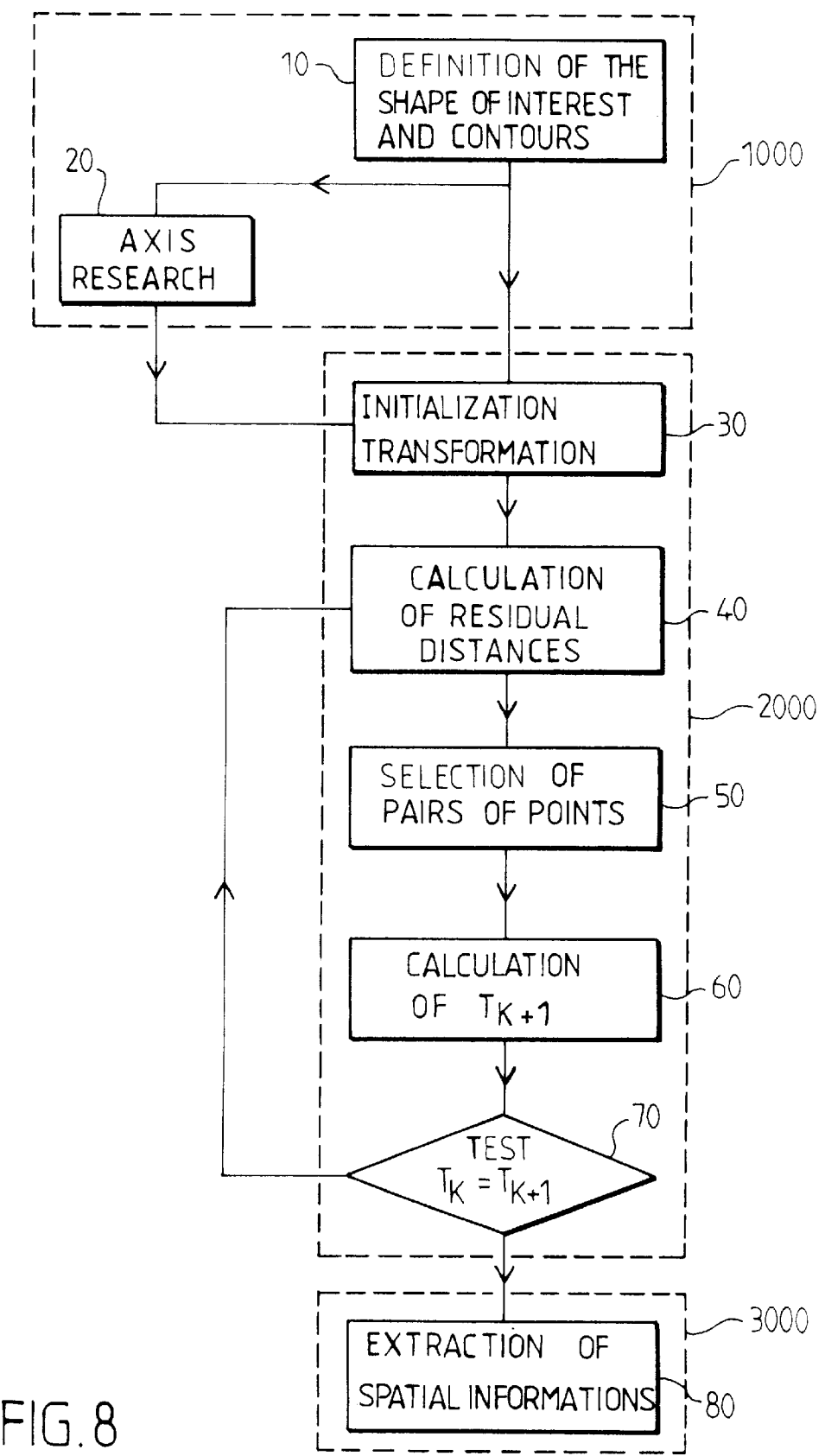
FIG. 8 is a mechanism illustrating the general operation of the device for conventional tomoscintigraphic images.
Figure 9:
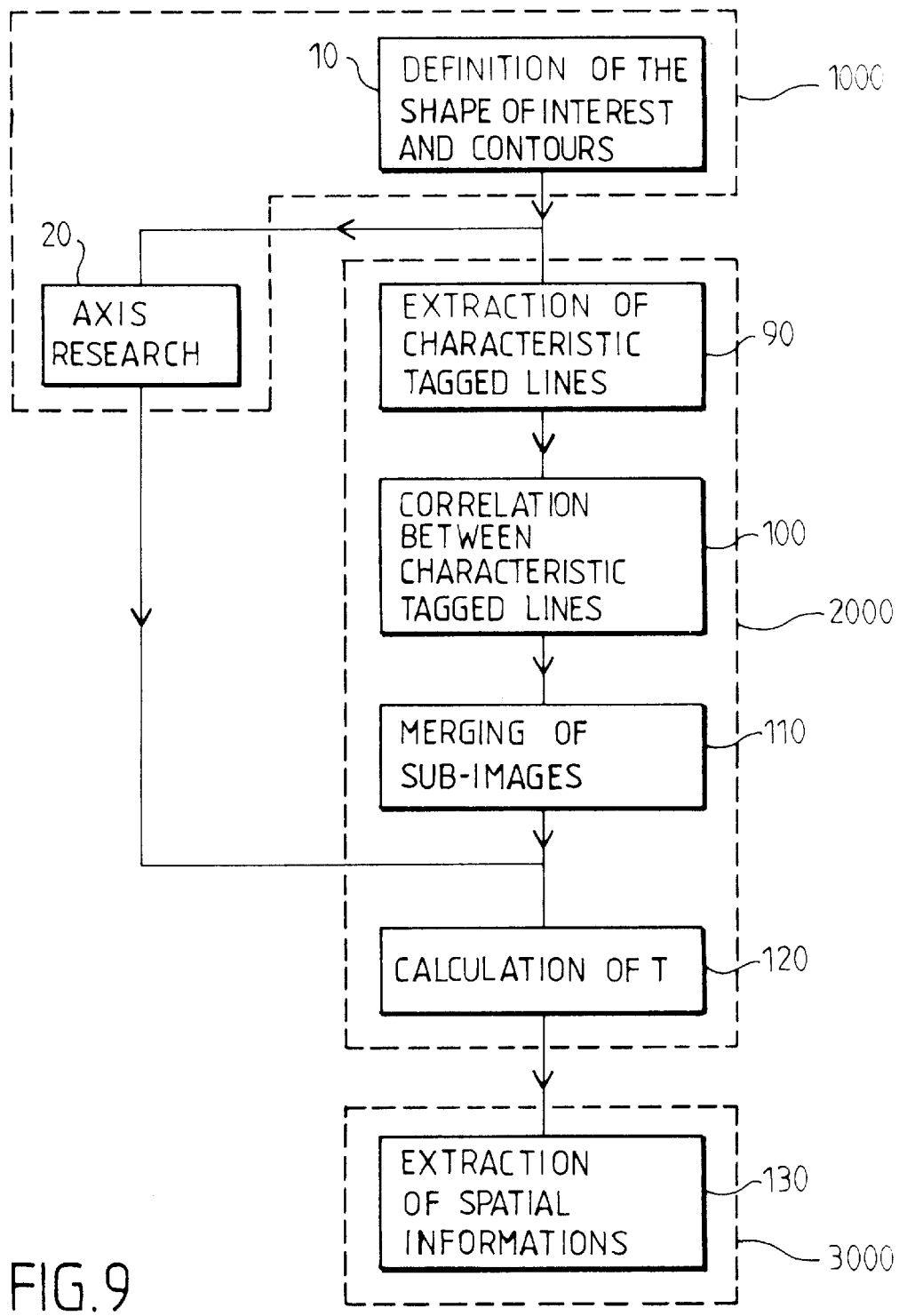
FIG. 9 is a mechanism illustrating the general operation of the device for tagged MRI images.

When this correspondence between the points is known, it is then possible to calculate the transformation T directly (without iteration) by using the same method as that of the step bearing the reference numeral 60 in the mechanism illustrated in FIG. 8. The operator chosen is therefore preferably of the least squares type. This constitutes the step 120 of the mechanism illustrated in FIG. 9.

Subsequently, in a final step 130, one proceeds to the extraction of the motion data by using the same method as that of the step bearing the reference numeral 80 in the mechanism illustrated in FIG. 8.

As in the case of conventional MRI images, the definition (selection) of the shape of interest may be effected by the defining module 1000, either automatically or manually by causing a technician or physician to intervene.

The device in accordance with the invention may be implanted in software-based form in a memory, for example a mass memory, in a work station. By way of example, a complete processing operation of eight 3D tomoscintigraphic images in a work station, for example, of the DEC Alpha 200 MHz type, requires between 30 and 40 mn.

To sum up, the method of processing sequential 3D images in accordance with the invention comprises the following steps.

A three-dimensional shape of interest is defined in a first step from at least one set of image data, it being possible for this definition to be automatic or manual.

In a second step, one extracts image data which represent characteristic points of the shape of interest, from each set. Of course, these first and second steps may be merged.

In a third step there is established, from the image data of the characteristic points of each image, a four-dimensional planispheric transformation in space and time (termed a spatial-temporal transformation), making it possible to pass from the extracted characteristic points (or contour) of a starting image of the sequence to the extracted characteristic points (or contour) of another image of the sequence.

The determination of the transformation starts with a starting image of the sequence. But this is not necessarily the very first image of the sequence. In fact, it suffices for the starting image (the first, last or intermediate) to define a starting space, and for it to be possible to attach a temporal reference relating to this starting space. Such a relative temporal reference may be determined, for example, by reference to a stored reference template or model representing the organ being analyzed at a known given instant.

Finally, in a fourth step, selected data representing the three-dimensional motion of the shape of interest, and more precisely of its contours, are derived from the parameters of the transformation.

More detailed descriptive elements are indicated in the document "Definition of a 4D continuous Polar Transformation for the Tracking and the Analysis of LV Motion", Research Report No. 3039 of INRIA, November, 1996 of Jérôme Declerck, Jacques Feldmar and Nicholas Ayache (the disclosure of which is in its entirety incorporated herein by reference).

The invention is not limited to the embodiments described above solely by way of example, but includes all the variants which may be envisaged by the expert within the scope of the claims given below.

Thus a mechanism has been described for the processing of conventional 3D images, wherein there have only been used image data representing the characteristic points of the contours of a shape of interest; it is obvious that for the purpose of improving the determination of the 4D transformation it would be possible to use at least a proportion of the points contained inside these contours.

Moreover, devices and a method have been described, wherein the four-dimensional (4D) transformation in space and time was planispheric, but it is obvious that it would be possible to use other types of 4D space and time transformations.

Finally, the above described devices and method are intended to process medical images, in particular of the cardiac muscle, but it is obvious that the invention is not limited to this single field. It also applies to other sectors of the medical field, as well as to non-medical fields in respect of which a knowledge of cyclic displacements of a shape of interest, and in particular of its contours, may prove to be particularly advantageous.

What is claimed is:

1. In an electronic device for the processing of sets of image data representing respectively three-dimensional digital images of the same region, taken at successive instants forming a sequence, the device comprising:

means capable of determining a three-dimensional shape of interest on the basis of at least one of said sets of image data, as well as of extracting at least first space-time image data of characteristic points of said shape of interest in a first one of said sets of image data, and second space-time image data of characteristic points of said shape of interest in a second one of said sets of image data;

processing means operable to effect a four-dimensional transformation of a given type, adapted to pass in space and time from said first set of image data to said second set of image data, and capable of determining parameters of said four-dimensional transformation enabling said transformation to pass from said first space-time image data of said characteristic points to said second space-time image data of said characteristic points; and means for displaying selected data derived from said determined parameters of said transformation, said selected data representing the spatial-temporal evolution of the characteristic points in the shape of interest.

2. A device according to claim 1, wherein each three-dimensional digital image of a given region comprises a series of three three-dimensional (3D) images representing orthogonal views with respect to one another, each one of said three 3D images of a series containing characteristic tagging lines, and wherein the processing means are capable of establishing a correspondence between the characteristic lines of successive images, then merging together the three images of the series forming each image, so as to form said image data representing said characteristic points of the said shape of interest.

3. A device according to claim 1, wherein the means for defining the shape of interest comprise manual selection means.

4. A device according to claim 1, wherein the means for defining the shape of interest comprise automatic selection means.

5. A device according to claim 4, wherein the automatic selection means are capable of effecting a comparison of the shape of the said image with at least one stored theoretical shape.

6. A device according to claim 1, wherein the digital images are medical images.

7. A device according to claim 6, wherein the comparable digital images are three-dimensional medical images of the regions of the heart of a living being, said heart forming the shape of interest.

8. A device according to claim 7, wherein the characteristic points represent the myocardium.

9. An electronic device for the processing of sets of image data representing respectively three-dimensional digital images of the same region, taken at successive instants, said device comprising:

means capable of defining a three-dimensional shape of interest on the basis of at least one of said sets of image data, as well as of extracting from each of said sets of image data, image data of characteristic points of the said shape of interest;

processing means capable of establishing, on the basis of the image data of said characteristic points, a four-dimensional transformation in space and time, making it possible to pass from the characteristic points extracted from a first image of the sequence, to the characteristic points extracted from another image of the sequence; and means for displaying selected data derived from parameters of the said transformation;

wherein the four-dimensional transformation is a planispheric transformation, and the processing means are capable of defining in a three-dimensional Cartesian space a three-dimensional "planispheric" reference system derived from a combination of spherical and cylindrical reference systems, and formed by three orthogonal vectors parallel to the characteristic directions of the shape of interest in said Cartesian space.

10. A device according to claim 9, wherein the processing means are arranged to apply to the image data in the initial Cartesian space a first transfer function making it possible to transform their Cartesian spatial coordinates into planispheric spatial coordinates, as well as to apply to the image data in the planispheric space a second transfer function making it possible to transform their spatial planispheric coordinates into Cartesian spatial coordinates.

11. A device according to claim 10, wherein said transformation is a composition of the first coordinate transfer function, a transfer function of characteristic points making it possible to pass from the three-dimensional planispheric coordinates of the characteristic points of an image to the three-dimensional planispheric coordinates of the characteristic points of another image of the sequence, and of the second transfer coordinate function.

12. A device according to claim 11, wherein the selected data represent three canonical motions, namely:—a radial motion relative to the origin of the planispheric reference system, a rotation relative to one of the vectors of said planispheric reference system, and an elevation relative to this same vector of said planispheric reference system.

13. A device according to claim 11, wherein the processing means are arranged to apply, to the image data representing said characteristic points in said planispheric reference system, an operator of the "least squares" type so as to determine the said transfer function of the characteristic points.

14. A device according to claim 13, wherein the processing means are arranged to determine the transfer function of the characteristic points in an iterative manner, on the basis of an "initialization" function.

15. A device according to claim 14, wherein the processing means are arranged to select the "initialization" function from a plurality of predetermined stored functions.

16. A device according to claim 14, wherein the initialization function is the identity.

17. A device according to claim 14, wherein the processing means are arranged for calculating the "initialization" function on the basis of sets of image data.

18. A device according to claim 14, wherein the processing means are capable of terminating the iterative calculation when a transformation $T_{k+1}$, determined during a k+1th iteration is substantially identical with the transformation $T_k$ determined during a kth iteration.

19. A device according to claim 14, wherein the processing means are capable of terminating the iterative calculation when the number of iterations becomes equal to a threshold.

20. A device according to claim 11, wherein the processing means are operative, firstly, to apply to each image data item extracted from an image the transfer function of characteristic points, so as to obtain an estimated image data item capable of corresponding to said extracted image data item, secondly, to determine from said image data extracted from said image at most one proximity image data item whose planispheric spatial coordinates are comparable to those of said estimated image data item, and, thirdly, to apply a first proximity criterion to each pair comprising the estimated image data item and the proximity image data item, so as to determine for each image, pairs of the estimated image data item and proximity image data item verifying said first criterion.

21. A device according to claim 20, wherein the processing means are arranged to apply a second proximity criterion to said pairs, so as to determine a list of filtered pairs intended to represent said characteristic points to which the said operator of the "least squares" type is applied.

22. In a method for processing sets of image data respectively representing three-dimensional digital images of one and the same region, taken at successive instants forming a sequence, the method comprising:

defining a three-dimensional shape of interest on the basis of at least one of the sets of image data, extracting from each of said sets of image data, image data representing characteristic points of said shape of interest;

on the basis of said image data of the characteristic points, establishing a four-dimensional transformation in space and time, making it possible to pass from characteristic points extracted from a first image of the sequence, to characteristic points extracted from another image of the sequence; and deriving, from parameters of said transformation, selected data representing motion of said shape of interest, said selected data further representing the spatial-temporal evolution of the characteristic points in the shape of interest.

23. A method for processing sets of image data respectively representing three-dimensional digital images of one and the same region, taken at successive instants, said method comprising:

defining a three-dimensional shape of interest on the basis of at least one of the sets of image data, extracting from each said set image data representing characteristic points of said shape of interest;

on the basis of the said image data of the characteristic points, establishing a four-dimensional transformation in space and time, making it possible to pass from characteristic points extracted from a first image of the sequence, to the characteristic points extracted from another image of the sequence; and deriving, from parameters of said transformation, selected data representing the motion of said shape of interest;

wherein the four-dimensional transformation is a planispheric transformation.

* * * * *